Nov. 9, 1954    A. OMOTO    2,693,641
THREAD LOOSENING AND CUTTING TOOL
Filed March 12, 1952
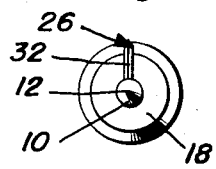
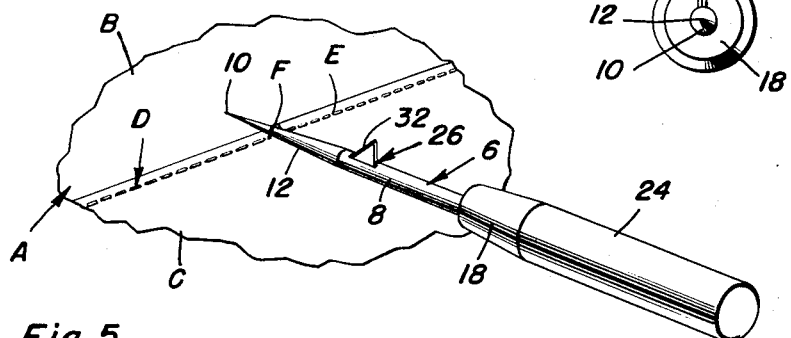
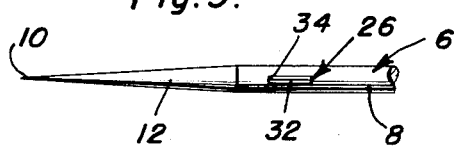
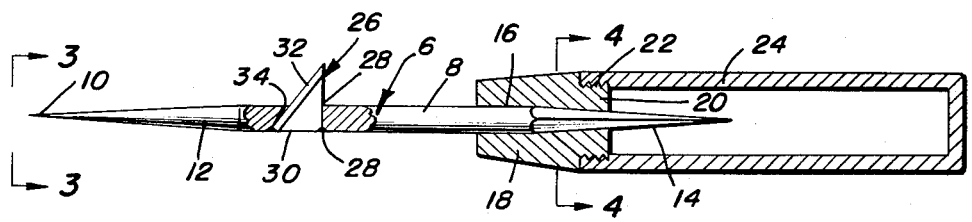
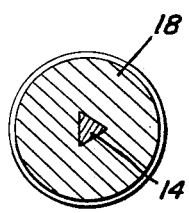
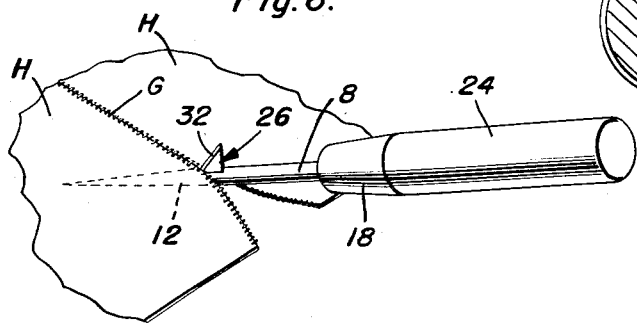
Akira Omoto
INVENTOR.
BY
Attorneys

United States Patent Office 2,693,641
Patented Nov. 9, 1954

2,693,641

THREAD LOOSENING AND CUTTING TOOL

Akira Omoto, San Francisco, Calif.

Application March 12, 1952, Serial No. 276,097

2 Claims. (Cl. 30—294)

The present invention relates to a structurally distinct and novelly constructed hand tool of general awl-like form which may be handily employed by a seamstress or other person in loosening and setting up a stitched thread in a manner to readily cut the thread for purposes of conveniently ripping a seam or other stitched components whenever necessary or desired.

It is a matter of common knowledge that all sorts of hand implements and tools have been contrived by others for purposes of cutting thread, cord, wire and the like. A typical tool would be one characterized by a suitable shank provided at one end with a handle and having means at its opposite end to pry the stitchings loose for purposes of readily severing and thereafter removing the same. The present invention appertains to a simple, economical and practical hand tool of maximum efficiency which is possessed of structural refinements and improvements cooperating in a manner to probe and pry the desired stitch so that it is effectively set up, after which the cutting means is piloted into severing relation with the stitch.

More specifically, the preferred embodiment of the invention has to do with an easy-to-handle tool characterized by a shank having a conical needlepoint or sharp pointed end which serves for probing and piloting, the opposite end of said shank being provided with handle means, the intermediate portion having a slot and there being a substantially triangular cutter blade fitted into the slot with the cutting edge projecting beyond the shank and at the desired oblique angle for quick and reliable thread cutting purposes.

Briefly summarized, the tool comprises a shank having an extended conical piloting point, a so-called needlepoint, at one end and a polygonal tang at the other end, an axially bored collar a portion of the bore of which is polygonal in cross-section, said tang being anchored in said bore, said collar having a reduced screw-threaded neck, a hollow handle open and screw-threaded at one end, said screw-threaded end portion being screwed on said neck, the intermediate portion of said shank having a slot therein, and a triangular blade lodged and fixedly anchored in said slot with one end portion projecting through and beyond said slot, said projecting end portion being provided with a forwardly and downwardly inclined cutting edge.

Other objects, features and advantages will become more readily apparent from the following description and the accompanying sheet of illustrative drawings.

In the accompanying sheet of drawings wherein like numerals are employed to designate like parts throughout the same:

Figure 1 is a perspective view of a hand tool constructed in accordance with the principles of the present invention and showing the manner in which the same is ordinarily used.

Figure 2 is an enlarged view with parts in section and elevation and illustrating all the details of construction.

Figure 3 is an end view observing the structure of Figure 2 in a direction from right to left, said view being on the line 3—3 of Figure 2, looking in the direction of the arrows.

Figure 4 is an enlarged cross-section on the line 4—4 of Figure 2 looking in the direction of the arrows.

Figure 5 is a fragmentary elevational view of the pointed blade-equipped end of the shank.

Figure 6 is a further perspective view showing how the tool is used for wholesale ripping.

Referring now to the drawings by reference numerals and accompanying lead lines and with reference to Figure 1, the letter A denotes a garment or the like embodying overlapping pieces of fabric B and C sewn together by stitching as at D. The individual stitches or portions of the thread are denoted conveniently by the letter E. One of these F is shown in the process of being loosened and lifted for cutting. This lifting and readying step or accomplishment is made easily possible through the use of the improved tool; the subject matter of the invention.

The tool as best shown in Figure 2 comprises a shank having a cylindrical rigid or solid body portion, said shank being denoted by the numeral 6 and the body portion by the numeral 8. The conical needlepoint, which is at one end, is denoted by the numeral 10 and the larger tapering portion which merges into the body portion is denoted at 12. The needlepoint is used, primarily, for piloting and probing and the tapering portion 12 is for lifting and looping the thread and setting it up for quick severance. The body portion is formed at its opposite end with a tapering three-cornered tang 14. This fits into a correspondingly shaped portion of the bore 16 in the ferrule-like collar 18. The latter is provided with a reduced screw-threaded neck 20 to accommodate the internal screw-threads 22 on the hollow cylindrical hand-grip 24. This construction provides a sturdy but light-weight handle, insures a reliable grip and makes it possible to hold the shank against undesirable axial turning. A suitable slot is provided in the intermediate portion of the shank and a substantially triangular blade 26 is mounted in the slot. It is spot welded in place as at 28—28. The edge portion 30 is flush with the surface of the shank while the rest of the blade protrudes beyond the shank to provide a V-shaped extension and one edge of the blade is sharpened to provide a cutting axis 32. This is oblique to the longitudinal edge of the shank and may be described as inclined forwardly and downwardly with respect to the shank. For more satisfactory cutting results a clearance space is left between the cutting edge and end of the slot as denoted at 34. It will be observed that the end of the slot closest to the handle is perpendicular to the axis of the shank, that the other end of the slot is canted at an angle different from that of the cutting edge of the blade.

This instrument will be found to be highly satisfactory in easily removing tough thread and cutting the same with requisite expediency. When two pieces of cloth are being sewed together on a sewing machine, the top ply or piece of cloth has a tendency to slide back while the machine is running and this causes wrinkles. It has been found that by pressing the point of this tool firmly on the top layer of cloth at right angles while sewing, this trouble can be avoided and the line of stitching can be properly and more satisfactorily handled. It is usually employed, as shown in Figure 1, wherein the pointed end 10 is used for probing between the thread and the cloth or other surface. This also pilots the shank into cutting position and the gradually increased diameter of the pointed end 12 lifts and loops the thread E so that it is set up and ready to receive the cutting edge 32 of the blade 26. The tool is held so that the blade is upwardly disposed as illustrated in Figure 1. The tool may be used in other ways but the primary function is shown in Figure 1. When one desires to rip stitching G somewhat en masse from components H—H the tool is used in the manner shown in Figure 6. This can be accomplished, as shown, much more easily than one could aptly use a safety razor blade.

Minor changes in shape, size, materials and rearrangement of parts may be resorted to in actual practice provided no departure is made from the invention as claimed.

Having described the invention, what is claimed as new is:

1. A stitched thread probing, loosening, looping and cutting tool comprising a linearly straight rigid shank having an axially alined handle rigidly secured to one end, the opposite end portion of said shank having a conical extension providing a rigid needlepoint also axially alined with the body portion of the shank, said needlepoint being of a length and cross-sectional dimension to function as a probe and thread loosener and also serving to loop and set the thread up for easy cutting, said body portion having a lengthwise slot opening through the top and bottom surfaces of said shank, the end of the slot closest to the handle being perpendicular to the axis of said body portion, the opposite end of said slot being oblique to said axis, and a triangular cutter blade passing upwardly through and fixed in said slot with one marginal edge abutting the first-named end of the slot, a second edge flush with the bottom surface of said body portion and the remaining edge sharpened and with a portion thereof projecting through and beyond the top of the slot and facing the needlepoint in oblique-angled relationship, the obliquity of the cutting edge being different from the obliquity of the adjacent end of said slot and providing a slight clearance space between the last-named end of the slot and said cutting edge.

2. A cutting tool for probing, loosening, looping and cutting stitched-down thread comprising a linearly straight rigid shank essentially cylindrical in cross-section and having an axially alined handle rigidly secured to one end portion, the opposite end portion of said shank being gradually tapered and reduced in cross-section and providing a conical extension defining a rigid needlepoint also axially alined with the body portion of the shank, said needlepoint being relatively short in length and of a cross-sectional dimension to function as a rigid probe which, in turn, serves to wedge itself between the thread and the stitched fabric and serves to gradually lift, loosen and transform the thread into loop form for easy cutting, said body portion having a lengthwise slot opening through the top and bottom surfaces of same, the end of the slot closest to said handle being spaced from the handle and also being perpendicular to the axis of the body portion, the opposite end of said slot being oblique to said axis, and spaced inwardly from the junctional connection between the body portion of the shank and the needlepoint and oblique to said axis, and a triangular cutter blade fitted upwardly through said slot and having its major body portion wedged and fixed in the slot with one marginal edge abutting the first named perpendicular end of the slot, a second edge flush with the bottom surface of said body portion and the over-all remaining edge being sharpened and providing a cutting edge, a predetermined portion of which is anchored in the slot and a portion of which projects through and beyond the top of the slot and body portion and faces the needlepoint in oblique angular relationship, the obliquity of the cutting edge being different from the obliquity of the adjacent end of said slot and providing a slight clearance space between the last-named end of the slot and said cutting edge, the distance between said one marginal edge of said blade and the adjacent forward end of said handle being less than the distance between the cutting edge and the leading end of said needlepoint.

References Cited in the file of this patent

UNITED STATES PATENTS

| Number | Name | Date |
| --- | --- | --- |
| 569,831 | Hurlburt | Oct. 20, 1896 |
| 1,099,885 | Peple | June 9, 1914 |
| 1,131,141 | Kalenborn | Mar. 9, 1915 |
| 1,207,108 | White | Dec. 5, 1916 |
| 1,748,869 | Drennan | Feb. 25, 1930 |
| 1,986,016 | Royston | Jan. 1, 1935 |
| 2,439,639 | Tilly | Apr. 13, 1948 |
| 2,610,399 | Adams et al. | Sept. 16, 1952 |

FOREIGN PATENTS

| Number | Country | Date |
| --- | --- | --- |
| 112,509 | Sweden | Sept. 21, 1944 |